United States Patent
Ueda et al.

(10) Patent No.: US 11,352,009 B2
(45) Date of Patent: Jun. 7, 2022

(54) VEHICLE CONTROL APPARATUS, VEHICLE CONTROL METHOD, AND PROGRAM

(71) Applicant: HONDA MOTOR CO., LTD., Tokyo (JP)

(72) Inventors: Yugo Ueda, Wako (JP); Akihiro Toda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 16/753,819

(22) PCT Filed: Oct. 10, 2017

(86) PCT No.: PCT/JP2017/036611
§ 371 (c)(1),
(2) Date: Apr. 6, 2020

(87) PCT Pub. No.: WO2019/073511
PCT Pub. Date: Apr. 18, 2019

(65) Prior Publication Data
US 2020/0282997 A1   Sep. 10, 2020

(51) Int. Cl.
*B60W 30/00*   (2006.01)
*B60W 30/18*   (2012.01)
(Continued)

(52) U.S. Cl.
CPC ...... *B60W 30/18159* (2020.02); *B60W 10/04* (2013.01); *B60W 10/20* (2013.01);
(Continued)

(58) Field of Classification Search
CPC ....... B60W 30/18159; B60W 60/0016; B60W 60/0017; B60W 60/0027; B60W 10/04;
(Continued)

(56) References Cited

U.S. PATENT DOCUMENTS

| 10,178,337 B1 * | 1/2019 | Yuen ................. H04N 5/38 |
| 2010/0049428 A1 | 2/2010 | Murata et al. |

(Continued)

FOREIGN PATENT DOCUMENTS

| JP | 2005-267470 | 9/2005 |
| JP | 2008-070950 | 3/2008 |

(Continued)

OTHER PUBLICATIONS

International Search Report and Written Opinion for International Application No. PCT/JP2017/036611 dated Jan. 16, 2018, 7 pages.

*Primary Examiner* — Russell Frejd
*Assistant Examiner* — Brittany Renee Peko
(74) *Attorney, Agent, or Firm* — Amin, Turocy & Watson, LLP

(57) ABSTRACT

A vehicle control apparatus includes: a road recognizer that recognizes a road form around a vehicle; a second-vehicle recognizer that recognizes a state of another vehicle around the vehicle; and a driving controller that allows the vehicle to travel by controlling one or both of steering and acceleration/deceleration of the vehicle and that prevents, upon passing of the vehicle through an intersection, passing of the vehicle through the intersection based on a presence of the other vehicle recognized by the second-vehicle recognizer, wherein in a case where the driving controller recognizes, by the road recognizer, that a plurality of lanes are present in a road of a right/left turn destination of the vehicle and recognizes, by the second-vehicle recognizer, that the other vehicle, which was an opposing vehicle approaching from a direction opposing the vehicle, has entered a lane on a rear side in a view from the vehicle among the plurality of lanes in the road of the right/left turn destination, the driving controller continues an entry control to the road of the right/left turn destination of the vehicle.

10 Claims, 11 Drawing Sheets

(51) Int. Cl.
  *B60W 60/00* (2020.01)
  *B60W 10/04* (2006.01)
  *B60W 10/20* (2006.01)
  *B60W 40/06* (2012.01)

(52) U.S. Cl.
  CPC ...... *B60W 30/18163* (2013.01); *B60W 40/06* (2013.01); *B60W 60/0016* (2020.02); *B60W 60/0017* (2020.02); *B60W 60/0027* (2020.02); *B60W 2552/10* (2020.02); *B60W 2552/50* (2020.02); *B60W 2554/20* (2020.02); *B60W 2554/4041* (2020.02); *B60W 2554/60* (2020.02)

(58) Field of Classification Search
  CPC ........... B60W 10/20; B60W 30/18163; B60W 40/06; B60W 2554/4041; B60W 2552/10
  See application file for complete search history.

(56) References Cited

U.S. PATENT DOCUMENTS

| | | | |
|---|---|---|---|
| 2014/0148998 A1 | 5/2014 | Goudy et al. | |
| 2016/0129835 A1* | 5/2016 | Kim | B60Q 9/008 |
| 2017/0293813 A1* | 10/2017 | Belhoula | G06K 9/00798 |
| 2017/0334440 A1* | 11/2017 | Myers | B60W 30/085 |
| 2019/0051186 A1* | 2/2019 | Fukumoto | G08G 1/167 |

FOREIGN PATENT DOCUMENTS

| | | |
|---|---|---|
| JP | 2016-224802 | 12/2016 |
| JP | 2017-156871 | 9/2017 |

\* cited by examiner

VEHICLE CONTROL APPARATUS, VEHICLE CONTROL METHOD, AND PROGRAM

TECHNICAL FIELD

The present invention relates to a vehicle control apparatus, a vehicle control method, and a program.

BACKGROUND

In recent years, researches have been conducted on an automatic control of a vehicle. In this regard, a technique is known in which when there are a plurality of lanes in a road that intersects a proceeding direction of a vehicle during automated driving, a proceeding direction in the plurality of lanes is determined (for example, refer to Patent Document 1).

RELATED ART DOCUMENTS

Patent Documents

Patent Document 1

Japanese Unexamined Patent Application, First Publication No. 2005-267470

SUMMARY OF INVENTION

Problems to be Solved by the Invention

However, the related art does not propose how to control the vehicle to proceed to the intersecting road in a case where there is an opposing vehicle.

An object of the present invention is to provide a vehicle control apparatus, a vehicle control method, and a program capable of performing a control that allows a vehicle to proceed to an intersecting road in a case where there is an opposing vehicle at an intersection.

Means for Solving the Problem

A first aspect of the present invention is a vehicle control apparatus, including: a road recognizer that recognizes a road form around a vehicle; a second-vehicle recognizer that recognizes a state of another vehicle around the vehicle; and a driving controller that allows the vehicle to travel by controlling one or both of steering and acceleration/deceleration of the vehicle and that prevents, upon passing of the vehicle through an intersection, passing of the vehicle through the intersection based on a presence of the other vehicle recognized by the second-vehicle recognizer, wherein in a case where the driving controller recognizes, by the road recognizer, that a plurality of lanes are present in a road of a right/left turn destination of the vehicle and recognizes, by the second-vehicle recognizer, that the other vehicle, which was an opposing vehicle approaching from a direction opposing the vehicle, has entered a lane on a rear side in a view from the vehicle among the plurality of lanes in the road of the right/left turn destination, the driving controller continues an entry control to the road of the right/left turn destination of the vehicle.

A second aspect of the present invention is the vehicle control apparatus described in the first aspect, wherein in a case where the second-vehicle recognizer recognizes that the other vehicle which was the opposing vehicle has entered a lane on a rear side in a view from the vehicle among the plurality of lanes in the road of the right/left turn destination, the driving controller controls the vehicle to enter a lane on a more front side than the lane that the other vehicle which was the opposing vehicle has entered.

A third aspect of the present invention is the vehicle control apparatus described in the first aspect, wherein the road recognizer recognizes a median strip on the road and recognizes the lane of the right/left turn destination based on a position of the recognized median strip.

A fourth aspect of the present invention is the vehicle control apparatus described in the first aspect, wherein in a case where a number of lanes of a first road before a right/left turn is identical to a number of lanes of a second road of the right/left turn destination, when the lane in which the vehicle traveled on the first road is an n-th (n is an arbitrary natural number) lane counted from a lane farthest from an opposing lane in a proceeding direction among the lanes of the second road, the driving controller allows the vehicle to enter, as a target lane of a right/left turn, an n-th lane counted from a lane farthest from an opposing lane in a proceeding direction also in the road of the right/left turn destination.

A fifth aspect of the present invention is the vehicle control apparatus described in the first aspect, wherein in a case where it is impossible for the road recognizer to recognize a median strip, the driving controller allows the vehicle to travel, as a target lane of a right turn, on a most distant lane in the view from the vehicle among the plurality of lanes of the right/left turn destination across an opposing lane.

A sixth aspect of the present invention is the vehicle control apparatus described in the fifth aspect, wherein the road recognizer recognizes, among corners that are present at an intersection at which the vehicle turns right or left across the opposing lane, a position of a corner that corresponds to an end part of a road of the right/left turn destination across the opposing lane, the end part being on a far side in the view from the vehicle, and the driving controller controls the vehicle to enter the most distant lane in the view from the vehicle among the plurality of lanes of the road of the right/left turn destination across the opposing lane using the position of the corner recognized by the road recognizer as a reference.

A seventh aspect of the present invention is the vehicle control apparatus described in the first aspect, wherein the road of the right/left turn destination is a destination of a right/left turn across an opposing lane.

An eighth aspect of the present invention is a vehicle control method including: by way of a road recognizer, recognizing a road form around a vehicle; by way of a second-vehicle recognizer, recognizing a state of another vehicle around the vehicle; and by way of a driving controller, allowing the vehicle to travel by controlling one or both of steering and acceleration/deceleration of the vehicle, preventing, upon passing of the vehicle through an intersection, passing of the vehicle through the intersection based on a presence of the other vehicle recognized by the second-vehicle recognizer, and in a case where the road recognizer recognizes that a plurality of lanes are present in a road of a right/left turn destination of the vehicle and the second-vehicle recognizer recognizes that the other vehicle, which was an opposing vehicle approaching from a direction opposing the vehicle, has entered a lane on a rear side in a view from the vehicle among the plurality of lanes in the road of the right/left turn destination, continuing an entry control to the road of the right/left turn destination of the vehicle.

A ninth aspect of the present invention is a program that causes a computer mounted on a vehicle including a road recognizer that recognizes a road form around the vehicle to: recognize a road form around the vehicle; recognize a state of another vehicle around the vehicle; allow the vehicle to travel by controlling one or both of steering and acceleration/deceleration of the vehicle; prevent, upon passing of the vehicle through an intersection, passing of the vehicle through the intersection based on a presence of the recognized other vehicle; and in a case where it is recognized that a plurality of lanes are present in a road of a right/left turn destination of the vehicle and it is recognized that the other vehicle, which was an opposing vehicle approaching from a direction opposing the vehicle, has entered a lane on a rear side in a view from the vehicle among the plurality of lanes in the road of the right/left turn destination, continue an entry control to the road of the right/left turn destination of the vehicle.

Advantage of the Invention

According to the first, eighth, and ninth aspects, it is possible to perform a control that allows the vehicle to proceed to an intersecting road in a case where the opposing vehicle is present at the intersection.

According to the second and seventh aspects, it is possible to prevent the vehicle from excessively waiting at the time of a right turn even if there is an opposing vehicle at the intersection.

According to the third aspect, it is possible to recognize a lane for entering a road that intersects the traveling lane at the intersection, and it is possible to prevent reverse running.

According to the fourth aspect, it is possible to allow the vehicle to smoothly enter a road that intersects the traveling lane at the intersection.

According to the fifth aspect, it is possible to prevent reverse running when entering a road that intersects the traveling lane even if the median strip cannot be recognized at the intersection.

According to the sixth aspect, it is possible to prevent reverse running when entering a road that intersects the traveling lane.

DESCRIPTION OF THE EMBODIMENTS

Hereinafter, an embodiment of a vehicle control apparatus, a vehicle control method, and a program of the present invention will be described with reference to the drawings.

[General Configuration]

Figure 1:
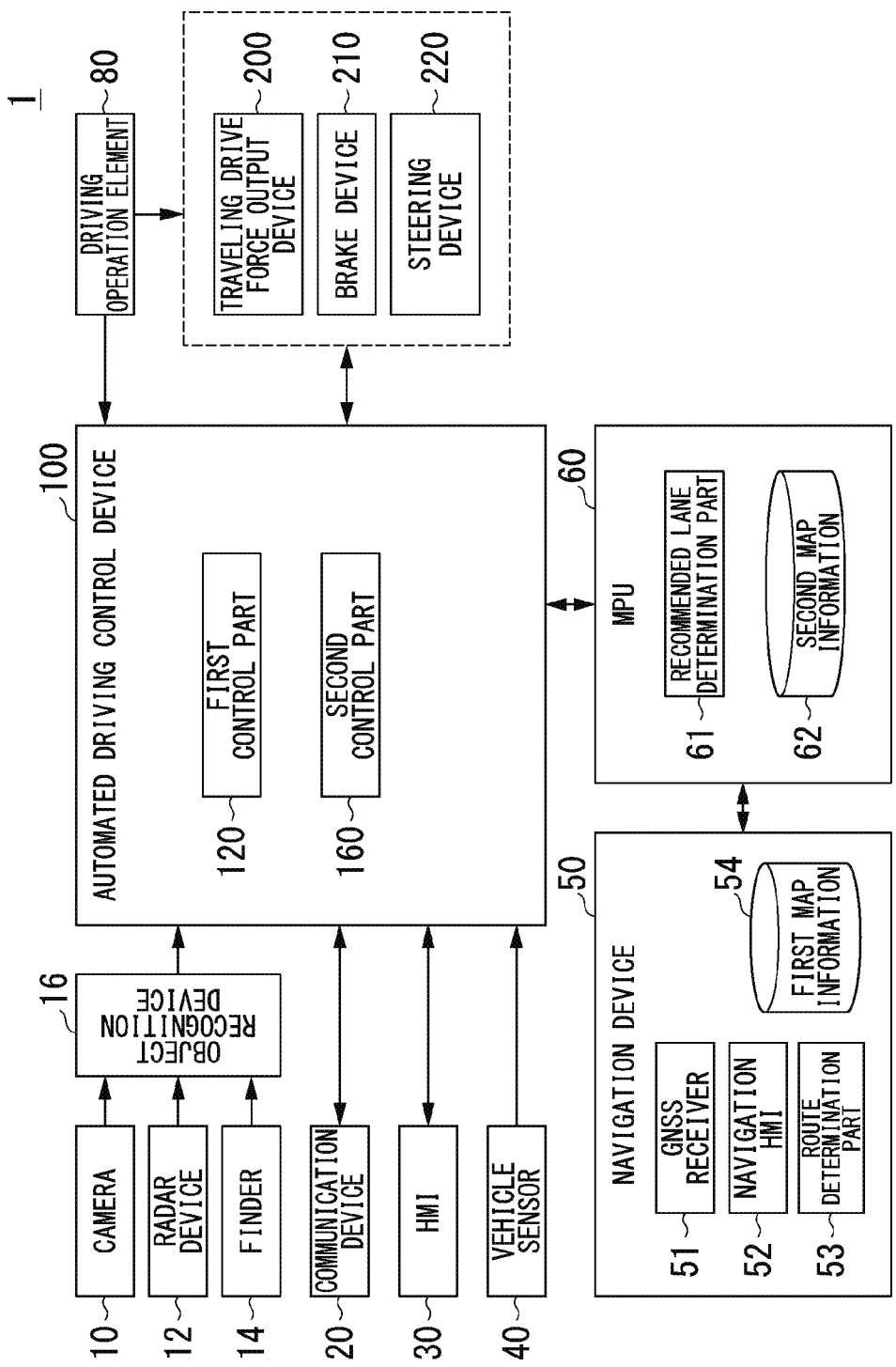
FIG. 1 is a configuration view of a vehicle system 1 using a vehicle control apparatus according to an embodiment.

FIG. 1 is a configuration view of a vehicle system 1 using a vehicle control apparatus according to an embodiment. A vehicle on which the vehicle system 1 is mounted is, for example, a vehicle having two wheels, three wheels, four wheels, or the like, and a drive source of the vehicle is an internal combustion engine such as a diesel engine or a gasoline engine, an electric motor, or the combination of the internal combustion engine and the electric motor. When the electric motor is included, the electric motor is operated by using generated electric power by a generator that is connected to the internal combustion engine or discharged electric power of a secondary battery or a fuel cell.

The vehicle system 1 includes, for example, a camera 10, a radar device 12, a finder 14, an object recognition device 16, a communication device 20, a HMI (Human Machine Interface) 30, a vehicle sensor 40, a navigation device 50, a MPU (Map-Positioning Unit) 60, a driving operation element 80, an automated driving control device 100, a travel drive force output device 200, a brake device 210, and a steering device 220. The devices and equipment are mutually connected by a multiplex communication line such as a CAN (Controller Area Network) communication line, a serial communication line, a wireless communication network, and the like. The configuration shown in FIG. 1 is merely an example; part of the configuration may be omitted, or another configuration may be further added.

The camera 10 is, for example, a digital camera that uses a solid-state imaging element such as a CCD (Charge-Coupled Device) or a CMOS (Complementary Metal-Oxide Semiconductor). One or a plurality of cameras 10 are attached to an arbitrary part of the vehicle (hereinafter, referred to as a vehicle M) on which the vehicle system 1 is mounted. When imaging a frontward direction, the camera 10 is attached to an upper part of a front window shield, a rear surface of a room mirror, and the like. The camera 10, for example, periodically and repeatedly captures an image around the vehicle M. The camera 10 may be a stereo camera.

The radar device 12 radiates radio waves such as millimeter waves to the vicinity of the vehicle M, detects radio waves (reflected waves) that are reflected by an object, and detects at least a position (distance and azimuth) of the object. One or a plurality of radar devices 12 are attached to an arbitrary part of the vehicle M. The radar device 12 may detect the position and the speed of the object by a FM-CW (Frequency-Modulated Continuous Wave) method.

The finder 14 is a LIDAR (Light Detection and Ranging). The finder 14 emits light to the vicinity of the vehicle M and measures scattered light. The finder 14 detects a distance to a target on the basis of a time period from emission of light to reception of light. The emitted light is, for example, a pulsed laser light. One or a plurality of finders 14 are attached to an arbitrary part of the vehicle M.

The object recognition device 16 performs a sensor fusion process with respect to a detection result by some or all of the camera 10, the radar device 12, and the finder 14 and recognizes the position, the category, the speed, and the like of the object. The object recognition device 16 outputs the recognition result to the automated driving control device 100. If necessary, the object recognition device 16 may output the recognition result of the camera 10, the radar device 12, and the finder 14 as is to the automated driving control device 100.

The communication device 20 communicates with another vehicle that is present around the vehicle M, for example, by using a cellular network, a Wi-Fi network, Bluetooth (registered trademark), DSRC (Dedicated Short-Range Communication), and the like or communicates with a variety of server apparatuses via a wireless base station.

The HMI 30 presents various information to an occupant of the vehicle M and accepts an input operation by the occupant. The HMI 30 includes various display devices, a speaker, a buzzer, a touch panel, a switch, a key, and the like.

The vehicle sensor 40 includes a vehicle speed sensor that detects a speed of the vehicle M, an acceleration sensor that detects an acceleration, a yaw rate sensor that detects an angular speed around a vertical axis, an azimuth sensor that detects an orientation of the vehicle M, and the like.

The navigation device 50 includes, for example, a GNSS (Global Navigation Satellite System) receiver 51, a navigation HMI 52, and a route determination part 53 and holds first map information 54 in a storage device such as a HDD (Hard Disk Drive) or a flash memory. The GNSS receiver 51 identifies the position of the vehicle M on the basis of a signal that is received from a GNSS satellite. The position of the vehicle M may be identified or supplemented by an INS (Inertial Navigation System) that utilizes an output of the vehicle sensor 40. The navigation HMI 52 includes a display device, a speaker, a touch panel, a key, and the like. Some or all of the navigation HMI 52 may be shared with the HMI 30 described above. For example, the route determination part 53 determines, with reference to the first map information 54, a route (hereinafter, a map route) from the position (or an input arbitrary position) of the vehicle M that is identified by the GNSS receiver 51 to a destination that is input by the occupant by using the navigation HMI 52. The first map information 54 is, for example, information in which a road shape is represented by a link indicating a road and a node that is connected by the link. The first map information 54 may include the curvature of a road, POI (Point Of Interest) information, and the like. The map route that is determined by the route determination part 53 is output to the MPU 60. The navigation device 50 may perform a route guide using the navigation HMI 52 on the basis of the map route that is determined by the route determination part 53. The navigation device 50 may be realized by, for example, a function of a terminal device such as a smartphone or a tablet terminal that is held by the occupant. The navigation device 50 may transmit a current position and a destination to a navigation server via the communication device 20 and may acquire a map route which is returned from the navigation server.

The MPU 60 functions, for example, as a recommended lane determination part 61 and holds second map information 62 in a storage device such as an HDD or a flash memory. The recommended lane determination part 61 divides the route that is supplied from the navigation device 50 into a plurality of blocks (for example, divides at an interval of 100 [m] regarding a vehicle proceeding direction) and determines a recommended lane for each block with reference to the second map information 62. The recommended lane determination part 61 determines, for example, which lane from the left the vehicle should travel on. In a case where a branching point, a merging point, or the like is present on the route, the recommended lane determination part 61 determines a recommended lane such that the vehicle M can travel on a reasonable route for proceeding to a branch destination.

The second map information 62 is map information having higher accuracy than the first map information 54. The second map information 62 includes, for example, information of the center of a lane, information of the boundary of a lane, or the like. The second map information 62 may include road information, traffic regulation information, address information (address and zip code), facility information, phone number information, and the like. The second map information 62 may be updated as needed by accessing another device using the communication device 20.

The driving operation element 80 includes, for example, an accelerator pedal, a brake pedal, a shift lever, a steering wheel, a deformed steer, a joystick, and other operation elements. A sensor that detects the amount of operation or the presence or absence of operation is attached to the driving operation element 80, and a detection result of the sensor is output to some or all of the automated driving control device 100 or the travel drive force output device 200, the brake device 210 and the steering device 220.

The automated driving control device 100 (vehicle control apparatus) includes, for example, a first control part 120 and a second control part 160. Each of the first control part 120 and the second control part 160 is realized, for example, by executing a program (software) by a hardware processor such as a CPU (Central Processing Unit). Some or all of the configuration elements may be realized by hardware (including circuitry) such as a LSI (Large-Scale Integration), an ASIC (Application-Specific Integrated Circuit), a FPGA (Field-Programmable Gate Array), or a GPU (Graphics-Processing Unit) or may be realized by the cooperation of software and hardware.

Figure 2:
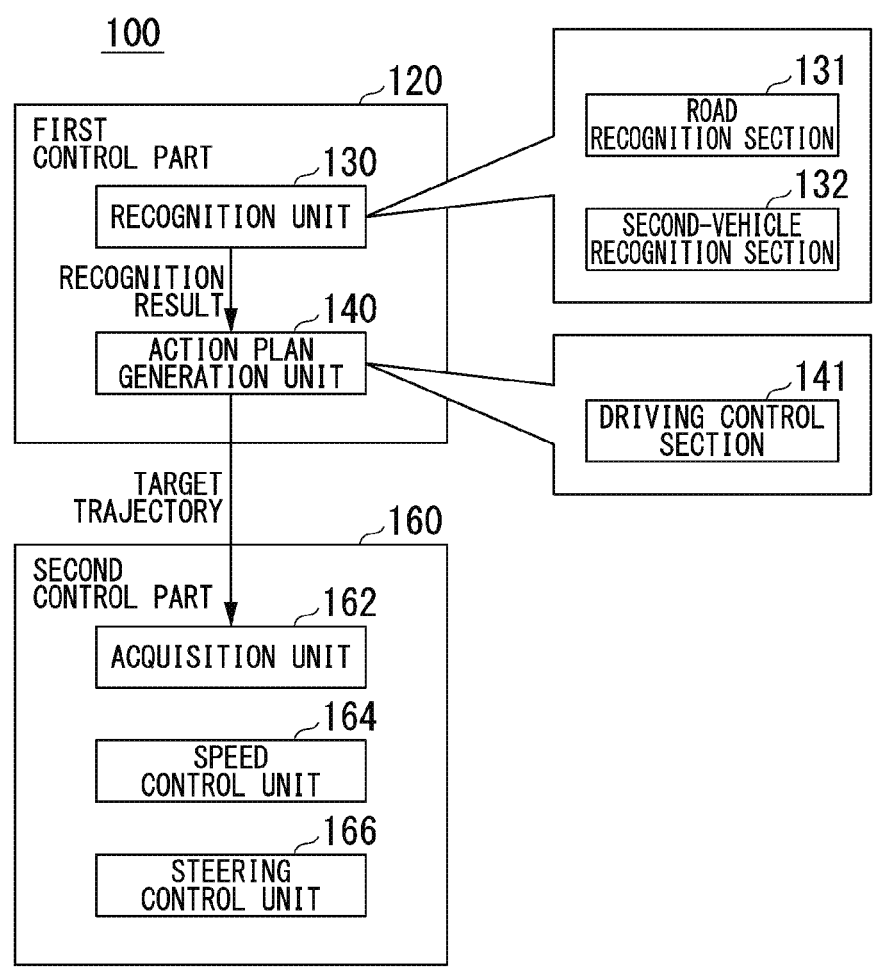
FIG. 2 is a functional configuration view of a first control part 120 and a second control part 160.

FIG. 2 is a functional configuration view of the first control part 120 and the second control part 160. The first control part 120 includes, for example, a recognition unit 130 and an action plan generation unit 140. The first control part 120 realizes, for example, a function based on AI (Artificial Intelligence) and a function based on a preliminarily given model in parallel. For example, a function of "recognizing an intersection" can be realized by performing recognition of an intersection by deep learning or the like and recognition based on a preliminarily given condition (such as a signal recognizable by pattern matching or a road sign) in parallel, scoring both recognition, and performing a comprehensive evaluation. Thereby, the reliability of automated driving is ensured.

The recognition unit 130 recognizes a state such as the position, the speed and the acceleration of an object in the vicinity of the vehicle M on the basis of information to be input from the camera 10, the radar device 12, and the finder 14 via the object recognition device 16. The position of the object is, for example, recognized as a position on an absolute coordinate having the origin at a representative point (a center of gravity, a center of a drive shaft, or the like) of the vehicle M, and is used for a control. The position of the object may be represented by a representative point such as a center of gravity or a corner of the object, or may be represented by a represented area. A "state" of the object may include the acceleration or jerk of the object, or an "action state" (for example, whether or not a lane change is being performed or is intended to be performed). Further, the recognition unit 130 recognizes a shape of a curve through which the vehicle M will pass from now on the basis of a captured image captured by the camera 10. The recognition unit 130 converts the shape of the curve from the captured image captured by the camera 10 into a real plane, and outputs, for example, two-dimensional point sequence information or information expressed using a model equivalent to the two-dimensional point sequence information to the action plan generation unit 140 as information indicating the shape of the curve.

Further, the recognition unit 130 recognizes, for example, a lane (traveling lane) in which the vehicle M is traveling. For example, the recognition unit 130 recognizes a traveling lane by comparing a pattern (for example, an array of a solid line and a dashed line) of a road section line obtained from the second map information 62 with a pattern of a road section line in the vicinity of the vehicle M recognized from an image captured by the camera 10. The recognition unit 130 may recognize a traveling lane by recognizing not only a road section line but also a traveling road boundary (road boundary) including a road section line, a road shoulder, a curb, a median strip, a guardrail, and the like. In such a recognition, the position of the vehicle M acquired from the navigation device 50 and a result of processing performed by the INS may be additionally considered. Further, the recognition unit 130 recognizes a temporary stop line, an obstacle, a signal, a tollgate, and other road events.

When a traveling lane is recognized, the recognition unit 130 recognizes the position and posture of the vehicle M relative to the traveling lane. The recognition unit 130 may recognize, for example, a deviation of a reference point of the vehicle M from a lane center and an angle formed with respect to a line connecting the lane centers in a proceeding direction of the vehicle M as a relative position and posture of the vehicle M with respect to the traveling lane. Alternatively, the recognition unit 130 may recognize a position and the like of the reference point of the vehicle M with respect to either side end (a road section line or a road boundary) of the traveling lane as the relative position of the vehicle M with respect to the traveling lane.

Further, in the recognition process described above, the recognition unit 130 may derive recognition accuracy and output the derived recognition accuracy to the action plan generation unit 140 as recognition accuracy information. For example, the recognition unit 130 generates the recognition accuracy information on the basis of a frequency at which a road section line can be recognized in a certain period of time.

Functions of a second-vehicle recognition section 132 and a road recognition section 131 included in the recognition unit 130 will be described below.

The action plan generation unit 140 generates a target trajectory on which the vehicle M will run in the future so as to perform automated driving for traveling on a recommended lane determined by the recommended lane determination part 61 in principle and coping with a situation in the vicinity of the vehicle M. The target trajectory includes, for example, a speed element. For example, the target trajectory is represented as a sequence of points (trajectory points) at which the vehicle M should arrive.

The second control part 160 includes, for example, an acquisition unit 162, a speed control unit 164, and a steering control unit 166. The acquisition unit 162 acquires information of the target trajectory (trajectory point) generated by the action plan generation unit 140 and stores the acquired information in a memory (not shown). The speed control unit 164 controls the travel drive force output device 200 or the brake device 210 on the basis of a speed element associated with the target trajectory stored in the memory. The steering control unit 166 controls the steering device 220 in accordance with a bend degree of the target trajectory stored in the memory. Processes of the speed control unit 164 and the steering control unit 166 are realized by, for example, a combination of a feed forward control and a feedback control. As an example, the steering control unit 166 performs a combination of the feed forward control in accordance with the curvature of a road in front of the vehicle M and the feedback control based on a deviation from the target trajectory.

The travel drive force output device 200 outputs a travel drive force (torque) used for a vehicle to travel to a drive wheel. The travel drive force output device 200 includes, for example, a combination of an internal combustion engine, an electric motor, a transmission, and the like, and an ECU that controls them. The ECU controls the constituents described above in accordance with information input from the second control part 160 or information input from the driving operation element 80.

The brake device 210 includes, for example, a brake caliper, a cylinder that transmits a hydraulic pressure to the brake caliper, an electric motor that generates a hydraulic pressure to the cylinder, and a brake ECU. The brake ECU controls the electric motor in accordance with the information input from the second control part 160 or the information input from the driving operation element 80 such that a brake torque corresponding to a braking operation is output to each wheel. The brake device 210 may include, as a backup, a mechanism that transmits the hydraulic pressure generated by an operation of the brake pedal included in the driving operation element 80 to the cylinder via a master cylinder. The brake device 210 is not limited to the configuration described above, and may be an electronically controlled hydraulic brake device that controls an actuator in accordance with the information input from the second control part 160 and transmits the hydraulic pressure of the master cylinder to the cylinder.

The steering device 220 includes, for example, a steering ECU and an electric motor. The electric motor changes a direction of the steering wheel by, for example, applying a force to a rack and pinion mechanism. The steering ECU drives the electric motor and changes the direction of the steering wheel in accordance with the information input from the second control unit 160 or the information input from the driving operation element 80.

[Recognition of Lane at Intersection]

Next, the contents of a process recognized by the recognition unit 130 will be described.

The recognition unit 130 includes, for example, a road recognition section 131 and a second-vehicle recognition section 132. The action plan generation unit 140 includes, for example, a driving control section 141. Hereinafter, a case where a law of left-hand traffic is applied will be described. In a road to which the law of right-hand traffic is applied, the right and left are reversed in the following description.

Figure 3:
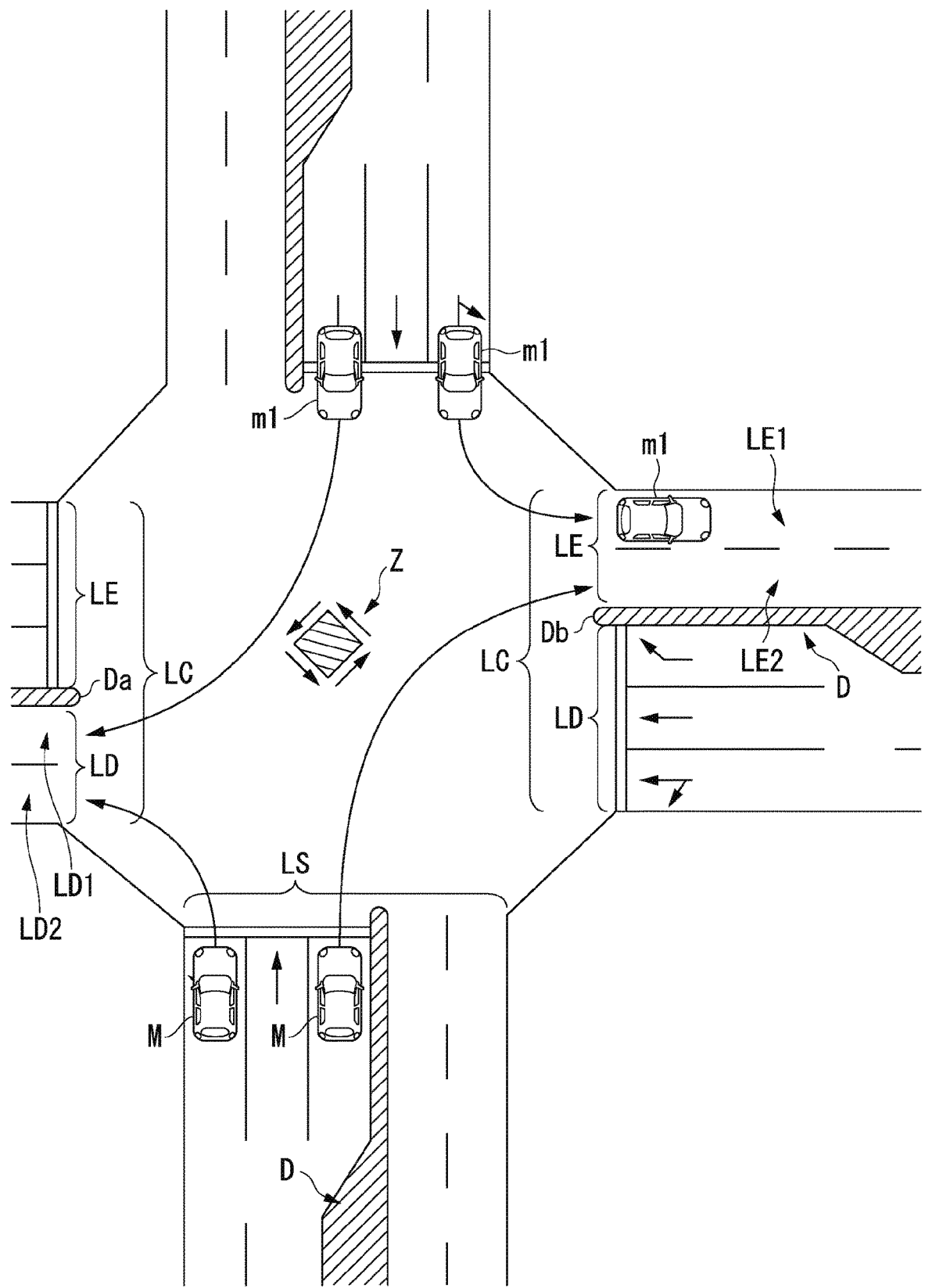
FIG. 3 is a view showing an example of an intersection where a median strip D is present.

FIG. 3 is a view showing an example of an intersection where a median strip D is present. When a plurality of lanes are separated by a median strip D, the separated one set of lanes and the separated other set of lanes become one-way traffic.

The median strip D is a road facility provided on the road so as to obstruct entry of a vehicle. The median strip D includes, for example, a block, a curb, a guardrail, a structure continuously formed of a barrier, a pole, a structure provided at a predetermined interval such as a tree, a space (zebra zone) surrounded by a white line indicating a prohibition of entry, and the like. However, a road section line such as a white line that simply separates lanes from each other is not included in the median strip D.

The action plan generation unit 140 starts a right turn event or a left turn event when the vehicle M is located, by a predetermined distance, in front of an intersection at which the right turn or the left turn is to be performed on the basis of a route guidance of the navigation device 50. When the right turn event or the left turn event is started, the action plan generation unit 140 requests the process to the road recognition section 131 and the like.

The road recognition section 131 starts a process of recognizing a road form in the vicinity of vehicle M upon request. The road recognition section 131 determines a proceeding direction of a lane of an intersecting road LC of an intersection in a case where the vehicle M performs the right turn or the left turn.

For example, in a case where the object recognition device 16 recognizes a median strip D arranged on the intersecting road LC that intersects a traveling lane LS, the road recognition section 131 determines that there is a median strip D on the intersecting road LC. When it is determined that there is a median strip D, the road recognition section 131 determines whether or not the median strip D at the intersection is interrupted by recognizing an end part of the median strip D on the basis of a recognition result of the object recognition device 16.

In the example of FIG. 3, in the determination whether or not the median strip D is interrupted, the road recognition section 131 recognizes end parts Da, Db of the median strip D, for example, on the basis of the recognition result of the object recognition device 16. In a case where the end parts Da, Db of the median strip D are recognized, the road recognition section 131 determines that the median strip D is interrupted. In a case where the end part of the median strip D cannot be recognized on the basis of the recognition result of the object recognition device 16, the road recognition section 131 determines that the median strip D is not interrupted.

In a case where it is determined that the median strip D is interrupted, the road recognition section 131 estimates a position of the median strip D with reference to positions of the recognized end parts Da, Db. The road recognition section 131 recognizes a plurality of lanes of the intersecting road LC on the basis of the estimated position of the median strip D.

In a case where the right turn event is started, the road recognition section 131 determines a lane of the right turn destination among the plurality of recognized lanes of the intersecting road LC. Among the plurality of recognized lanes of the intersecting road LC, the road recognition section 131 determines that a proceeding direction of a plurality of lanes LE on a further rear side than the median strip D in a view from the vehicle M is a rightward direction. The road recognition section 131 determines that the plurality of lanes LE are lanes of the right turn destination on the basis of a result of determination of the proceeding direction.

In a case where the left turn event is started, the road recognition section 131 determines a lane of the left turn destination among the plurality of recognized lanes of the intersecting road LC. Further, among the plurality of recognized lanes of the intersecting road LC, the road recognition section 131 determines that a proceeding direction of a plurality of lanes LD on a further front side than the median strip D in a view from the vehicle M is a leftward direction.

Here, the road recognition section 131 determines that the median strip D is not interrupted, for example, in a case where the end part of the median strip D cannot be recognized on the basis of the recognition result of the object recognition device 16. For example, when reaching an intersecting road LC such as a T-shaped intersection where a median strip D having no interruption is present, the road recognition section 131 determines that a proceeding direction of the plurality of lanes LD on a further front side than the median strip D in a view from the vehicle M is the leftward direction on the basis of the recognition result of the median strip D.

Alternatively, the road recognition section 131 may perform a determination process regarding the median strip D by combining information of the lane stored in the second map information 62 with the recognition result such as a guide display Z of the proceeding direction in the intersection. The road recognition section 131 outputs the determination result of the lane to the second-vehicle recognition section 132.

[Recognition of Another Vehicle In Intersection]

The action plan generation unit 140 generates a target trajectory to a lane on which the vehicle should travel in the right turn or the left turn on the basis of the determination result and the recognition result by the road recognition section 131 and the second-vehicle recognition section 132. The driving control section 141 controls one or both of the steering control unit 166 and the speed control unit 164 to perform steering and acceleration/deceleration on the basis of the generated target trajectory, and allows the vehicle M to travel.

The speed control unit 164 and the steering control unit 166 control the travel drive force output device 200, the brake device 210, and the steering device 220 to allow the vehicle M to travel on a lane on which the vehicle M should travel on the basis of the information of the right-turn or left-turn target trajectory generated by the action plan generation unit 140.

The second-vehicle recognition section 132 recognizes a traveling state of another vehicle m in the vicinity of the vehicle M. The traveling state of the other vehicle m refers to the behavior of the other vehicle m such as the position, the speed, and the proceeding direction.

[Control at Right Turn]

For example, at a time of a right turn across an opposing lane, the second-vehicle recognition section 132 determines whether there is an opposing vehicle m1 approaching from a direction opposite to the vehicle M among other vehicles m on the basis of the recognition result of the object recognition device 16.

The second-vehicle recognition section 132 determines whether or not the opposing vehicle m1 has turned left in a case where it is determined that the opposing vehicle m1 is present. In a case where it is determined that the opposing vehicle m1 has turned left, the second-vehicle recognition section 132 determines which lane among the plurality of lanes LE in the intersecting road LC the other vehicle which was the opposing vehicle m1 has entered on the basis of the determination result of the road recognition section 131. In the determination, the second-vehicle recognition section 132 recognizes that the other vehicle which was the opposing vehicle m1 has entered an n-th (n is an arbitrary natural number) lane counted from the farthest lane from the opposing lane in the proceeding direction of the plurality of lanes LE among the plurality of lanes LE of the crossing road LC. Here, an opposing lane is a concept that includes all of the opposing lanes (for example, a plurality of lanes LD). In the example of FIG. 3, the lane farthest from the opposing lane is a lane LE1 farthest from the plurality of lanes LD. The second-vehicle recognition section 132 recognizes that, for example, the other vehicle which was the opposing vehicle m1 has entered an n-th lane from the farthest lane from the plurality of lanes LD after a left turn.

The second-vehicle recognition section 132 determines whether or not the other vehicle which was the opposing vehicle m1 has entered a lane on a rear side in a view from the vehicle M in the plurality of lanes LE of the intersecting road LC on the basis of the recognition result of the lane that the other vehicle which was the opposing vehicle m1 has entered. The rear side refers to, for example, a (n-1 or less)-th lane counted from the farthest lane from the opposite lane in the proceeding direction of the plurality of lanes LE. The road recognition section 131 and the second-vehicle recognition section 132 output the determination result and the recognition result to the action plan generation unit 140.

For example, in a case where the opposing vehicle m1 continues to proceed straight, the driving control section 141 prioritizes traveling of the opposing vehicle m1 and allows an entry control to the road of the right turn destination of the vehicle M to be in a standby state. During the entry control is in the standby state, the driving control section 141 waits for a chance of entering the road of the right turn destination on the basis of the determination result of the second-vehicle recognition section 132.

However, for example, in a case where the road recognition section 131 obtains a recognition result that there are a plurality of lanes in the intersecting road LC of the right turn destination of the vehicle M, and in a case where the second-vehicle recognition section 132 obtains a recognition result that the other vehicle which was the opposing vehicle m1 has entered the lane on the rear side in a view from the vehicle M among the plurality of lanes LE of the right turn destination, the driving control unit 141 continues the entry control to the road of the right turn destination of the vehicle and allows the vehicle M to enter a lane on a further front side in a view from the vehicle M than the lane on which the other vehicle which was the opposing vehicle m1 travels.

The reason why the driving control section 141 performs such a process is that, in a case where the other vehicle which was the opposing vehicle m1 has entered the lane on the rear side of the plurality of lanes LE, it is possible to enter the lane on the front side. By performing such a process, it is possible to prevent the vehicle M from excessively waiting when turning right.

For example, when obtaining a determination that the opposing vehicle m1 is not recognized, the driving control section 141 allows the vehicle M to travel such that the most distant lane LE1 in a view from the vehicle M among the plurality of lanes LE of the right turn destination is a target lane of the right turn. The most distant lane LE1 in a view from the vehicle M is the first lane counted from the lane farthest from the opposing lane in the proceeding direction of the plurality of lanes LE having the same proceeding direction after the right turn. However, even in a case where, as a result of a right turn of the opposing vehicle m1, a determination that the right turn is available is obtained, the driving control unit 141 may allow the vehicle M to travel such that the most distant lane LE1 in a view from the vehicle M among the plurality of lanes LE of the right turn destination is a target lane of the right turn.

Next, a process in an intersection where there is no median strip D will be described. When obtaining a determination that the median strip D cannot be recognized by the road recognition section 131, the driving control section 141 sets the most distant lane LE1 in a view from the vehicle M among the plurality of lanes LE of the right turn destination across the opposing lane as the target lane of the right turn and allows the vehicle M to enter the lane LE1 The reason why the driving control section 141 performs such a process is to prevent reverse running in entering the road that intersects the traveling lane LS. In this case, when the second-vehicle recognition section 132 obtains a result that the opposing vehicle m1 is recognized, the driving control section 141 prioritizes traveling of the opposing vehicle m1, and the entry control to the road of the right turn destination of the vehicle M is made to be in a standby state.

[Control at Left Turn]

The control at the right turn described above can also be applied, for example, to when the vehicle M turns left without crossing the opposing lane. In that case, the right and left sides are reversed in the above-described control. Hereinafter, a control that differs from that at the right turn will be described.

For example, in a case where the opposing vehicle m1 continues the right turn, the driving control section 141 performs an entry control to the road of the left turn destination of the vehicle M.

However, for example, in a case where the road recognition section 131 obtains a recognition result that there are a plurality of lanes in the intersecting road LC of the left turn destination of the vehicle M, and in a case where the second-vehicle recognition section 132 obtains a recognition result that the other vehicle which was the opposing vehicle m1 has entered the lane on the rear side in a view from the vehicle M among the plurality of lanes LE of the right turn destination, the driving control unit 141 continues the entry control to the road of the left turn destination of the vehicle and allows the vehicle M to enter a lane on a further front side in a view from the vehicle M than the lane on which the other vehicle which was the opposing vehicle m1 travels.

The reason why the driving control section 141 performs such a process is that, in a case where the other vehicle which was the opposing vehicle m1 has entered the lane on the rear side of the plurality of lanes LE, it is possible to enter the lane on the front side. By performing such a process, it is possible to prevent the vehicle M from excessively waiting when turning left.

For example, when obtaining a determination that the opposing vehicle m1 is not recognized, the driving control section 141 allows the vehicle M to travel such that the most front lane LD1 in a view from the vehicle M among the plurality of lanes LD of the left turn destination is a target lane of the left turn. The most front lane LD1 in a view from the vehicle M is the first lane counted from the lane farthest from the opposing lane in the proceeding direction of the plurality of lanes LD having the same proceeding direction after the left turn. However, even in a case where, as a result of a left turn or proceeding straight of the opposing vehicle m1, a determination that the left turn is available is obtained, the driving control unit 141 may allow the vehicle M to travel such that the most front lane LD1 in a view from the vehicle M among the plurality of lanes LD of the left turn destination is a target lane of the right turn.

Next, a process in an intersection where there is no median strip D will be described. When obtaining a determination that the median strip D cannot be recognized by the road recognition section 131, the driving control section 141 sets the lane LD1 which is most front in a view from the vehicle M among the plurality of lanes LD of the left turn destination that does not cross the opposing lane as the target lane of the left turn and allows the vehicle M to enter the lane LD1. The reason why the driving control section 141 performs such a process is to prevent reverse running in entering the road that intersects the traveling lane LS. In this case, when the second-vehicle recognition section 132 obtains a result that the opposing vehicle m1 is recognized, the driving control section 141 performs an entry control to the road of the left turn destination of the vehicle M on the basis of the proceeding direction of the opposing vehicle m1 as described above.

Figure 4:
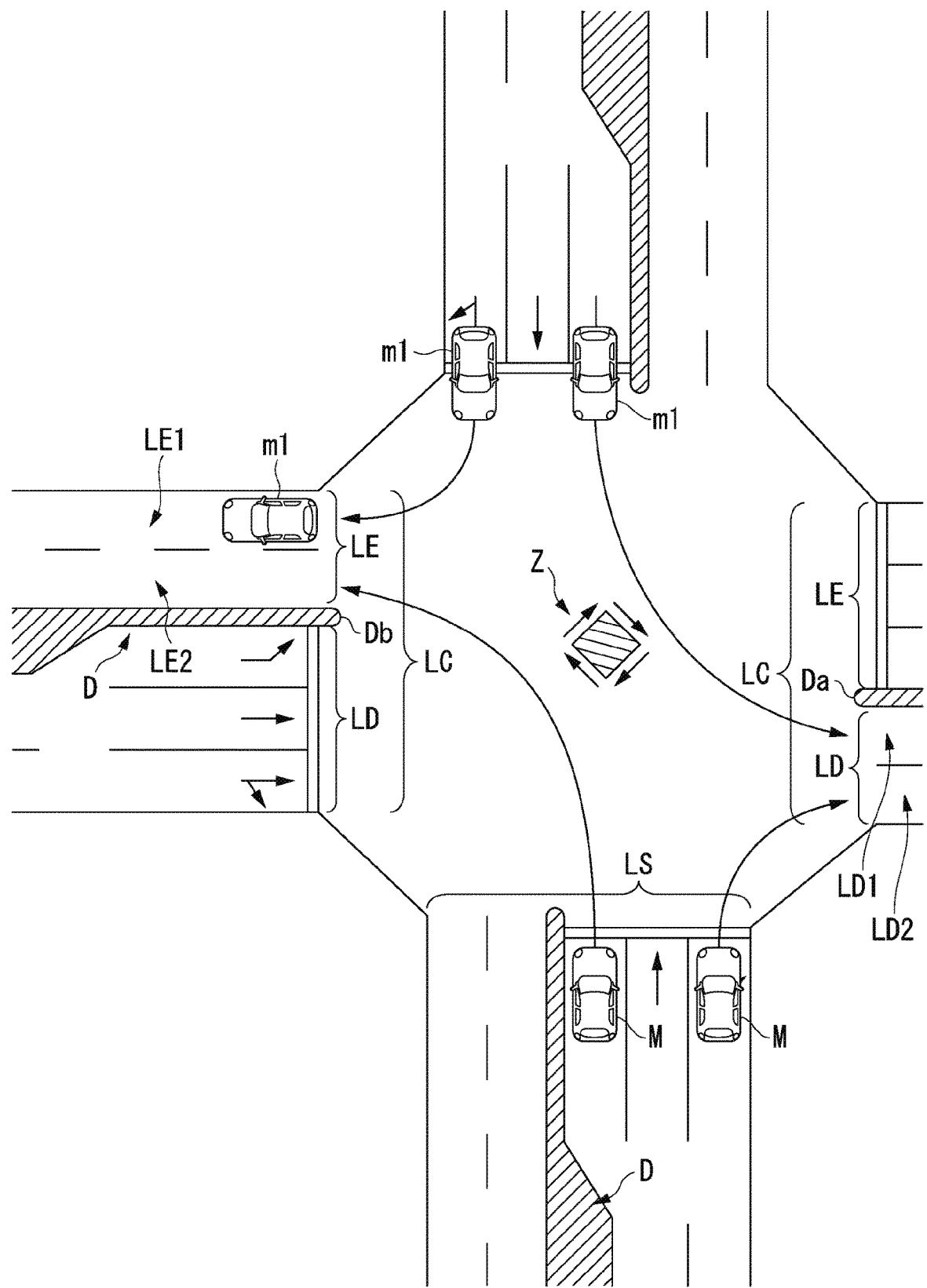
FIG. 4 is a view describing a control of a right/left turn of a vehicle M in a road to which a law of traffic classification opposite to traffic classification of the road shown in the example of FIG. 3 is applied.

The control in the right and left turns of vehicle M described above is also performed in a road to which a law of right-hand traffic is applied. FIG. 4 is a view describing a control of a right/left turn of the vehicle M in a road to which a law of traffic classification opposite to the traffic classification of the road shown in the example of FIG. 3 is applied. The control of a right/left turn of the vehicle M described above may also be applied to the road to which the law of the right-hand traffic is applied. In that case, the right and left are reversed in the above description.

Figure 5:
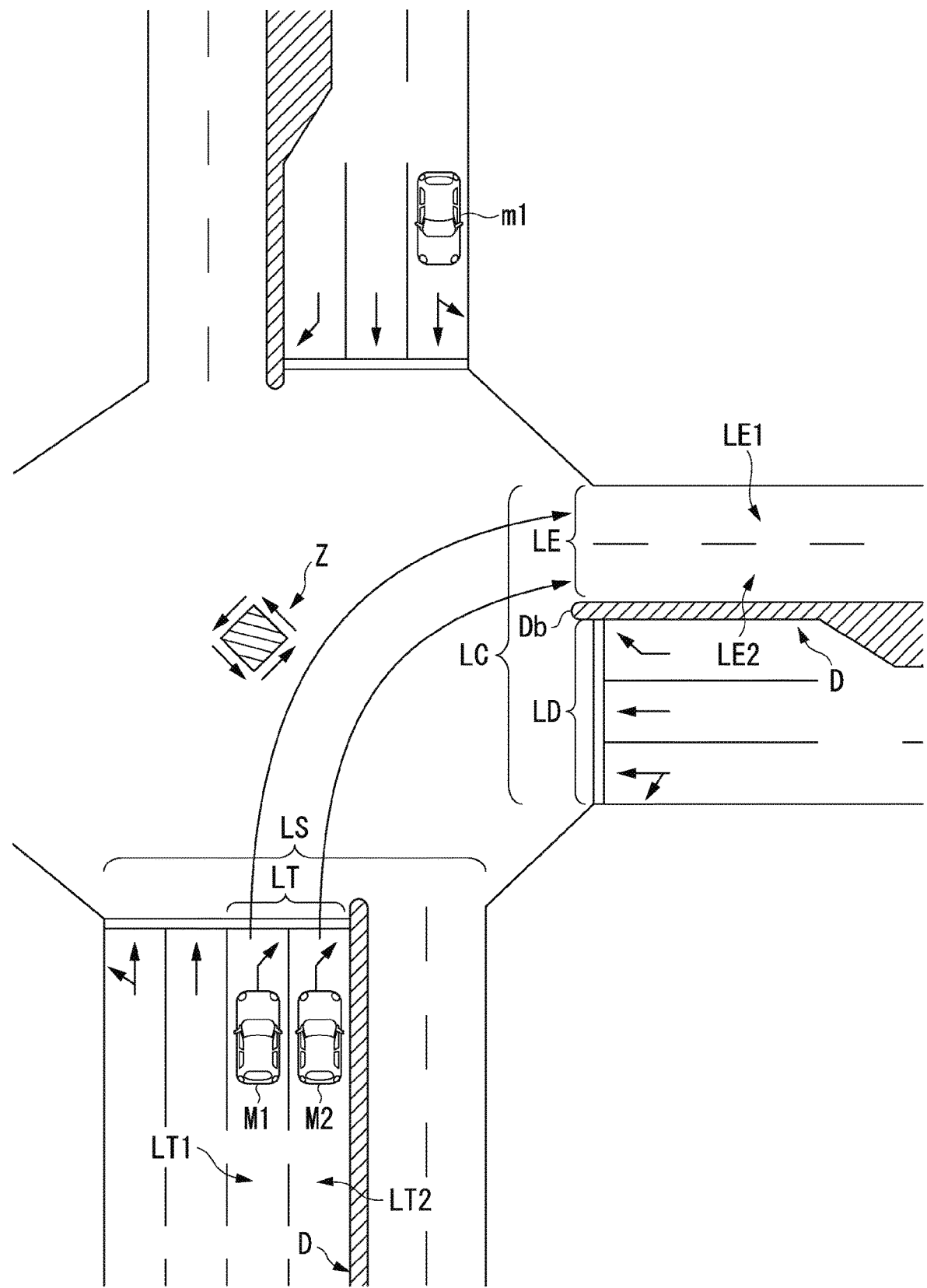
FIG. 5 is a view showing an example of an intersection where the number of lanes of a right turn lane before right turn is identical to the number of lanes of a lane LE of the right turn destination.

Next, a process of a case where there are a plurality of right turn lanes will be described. FIG. 5 is a view showing an example of an intersection where the number of lanes of a right turn lane LT before right turn is identical to the number of lanes of the lane LE of the right turn destination. In a case where the number of lanes of the right-turn lane LT (first road) of the traveling lane LS before the right turn is identical to the number of lanes of the plurality of lanes LE (second road) of the right turn destination, when the lane on which the vehicle M travels in the right turn lane LT is an n-th lane counted from the farthest lane from the opposing lane in the proceeding direction among lanes of the plurality of lanes LE, the driving control unit 141 may allow the vehicle M to enter the n-th lane counted from the farthest lane from the opposing lane in the proceeding direction also in the road of the right turn destination as the target lane of the right turn.

For example, when a plurality of lanes are provided in the right turn lane LT of the traveling lane LS before the right turn, the driving control section 141 maintains the order from the left of the lane on which the vehicle travels before the right turn also in the plurality of lanes LE of the right turn destination and allows the vehicles M1, M2 to enter the plurality of lanes LE of the right turn destination. According to such a process, in a case where there are a plurality of lanes in the right turn lane LT, even if there is a parallel vehicle in the right turn lane LT, the interference between right turn trajectories of the vehicle M and the parallel vehicle is prevented.

When obtaining a determination that the opposing vehicle m1 is present in the right turn lane LT on which a plurality of lanes are provided, the driving control section 141 determines whether or not the vehicle M is able to enter a front lane LE2 in a view from the vehicle M in the plurality of lanes LC of the right turn destination on the basis of a traveling state of the opposing vehicle m1 and the lane number from the left of the lane in the right turn lane LT on which the vehicle M travels. The reason why the driving control section 141 performs such a process is to allow the vehicle M to smoothly enter an intersecting road from the right turn lane LT in the intersection while preventing interference between the trajectory of the vehicle M and the trajectory of a vehicle traveling in parallel and turning right.

In the example shown in FIG. 5, the number of lanes of the lanes LT1, LT2 in the right turn lane LT of the traveling lane LS before the right turn is identical to the number of lanes of the plurality of lanes LE1, LE2 of the right turn destination. In a case where the vehicle M1 is traveling on the first lane LT1 from the left in the right turn lane LT, the driving control section 141 allows the vehicle M1 to enter the first lane LE1 from the left of the right turn destination.

In a case where a determination that the opposing vehicle m1 is present is obtained in the lane LT1, the driving control section 141 allows the vehicle M1 to wait until a timing when the vehicle M1 can turn right on the basis of a traveling state of the opposing vehicle m1 and then allows the vehicle M1 to enter the lane LE1. The traveling state is a behavior of the other vehicle m such as passing, turning right, turning left, waiting, locating at a sufficient distance.

Similarly, in a case where the vehicle M2 is traveling on the second lane LT2 from the left before the right turn, the driving control section 141 allows the vehicle M2 to enter the second lane LE2 from the left of the right turn destination. In a case where a determination that the opposing vehicle m1 is present is obtained in the lane LT2, the driving control section 141 allows the vehicle M to wait until a timing when the vehicle M can turn right on the basis of a traveling state of the opposing vehicle m1 and then allows the vehicle M to enter the lane LE2.

However, in a case where a determination that the opposing vehicle m1 turns left and the opposing vehicle m1 has entered the lane LE1 on the rear side in a view from the vehicle M among the plurality of lanes LE of the right turn destination is obtained, the driving control unit 141 may allow the vehicle M to enter the lane LE2.

Figure 6:
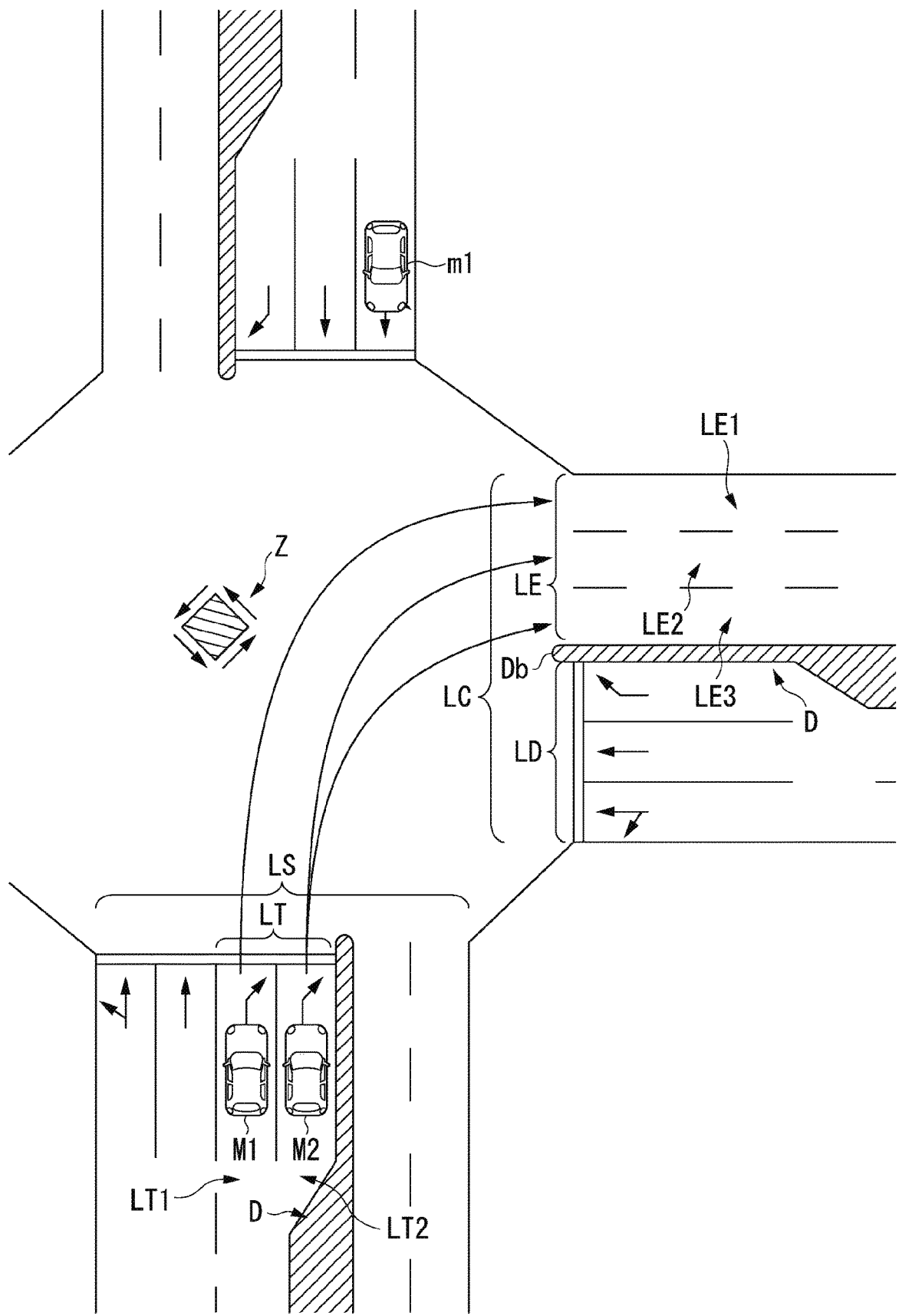
FIG. 6 is a view showing an example of an intersection where the number of lanes of a right turn lane LT is different from the number of lanes of the lane LE of the right turn destination.

FIG. 6 is a view showing an example of an intersection where the number of lanes of the right turn lane LT is different from the number of lanes of the lane LE of the right turn destination. In the example of FIG. 6, the number of lanes of the lanes LT1, LT2 of the plurality of right turn lanes LT is different from the number of lanes of a plurality of lanes LE1, LE2, LE3 of the right turn destination.

In a case where the vehicle M1 is traveling on the first lane LT1 from the left before the right turn, the driving control section 141 allows the vehicle M1 to enter the first lane LE1 from the left of the right turn destination. In a case where the opposing vehicle m1 is present, the driving control section 141 allows the vehicle M1 to wait until a timing when the vehicle M1 can turn right on the basis of a traveling state of the opposing vehicle m1 and then allows the vehicle M1 to enter the lane LE1.

Similarly, in a case where the vehicle M2 is traveling on the second lane LT2 from the left before the right turn, the driving control section 141 allows the vehicle M2 to enter the second lane LE2 from the left of the right turn destination. In a case where the opposing vehicle m1 is present, the driving control section 141 allows the vehicle M to wait until a timing when the vehicle M can turn right on the basis of a traveling state of the opposing vehicle m1 and then allows the vehicle M to enter the lane LE2.

However, in a case where a determination that the opposing vehicle m1 turns left and the opposing vehicle m1 has entered the lane LE1 on the rear side in a view from the vehicle M among the plurality of lanes LE of the right turn destination is obtained, the driving control unit 141 may allow the vehicle M2 to enter the lane LE2 without allowing the vehicle M2 to wait. At this time, the driving control unit 141 may allow the vehicle M2 to enter the lane LE3 on the further front side than the opposing vehicle m1.

Figure 7:
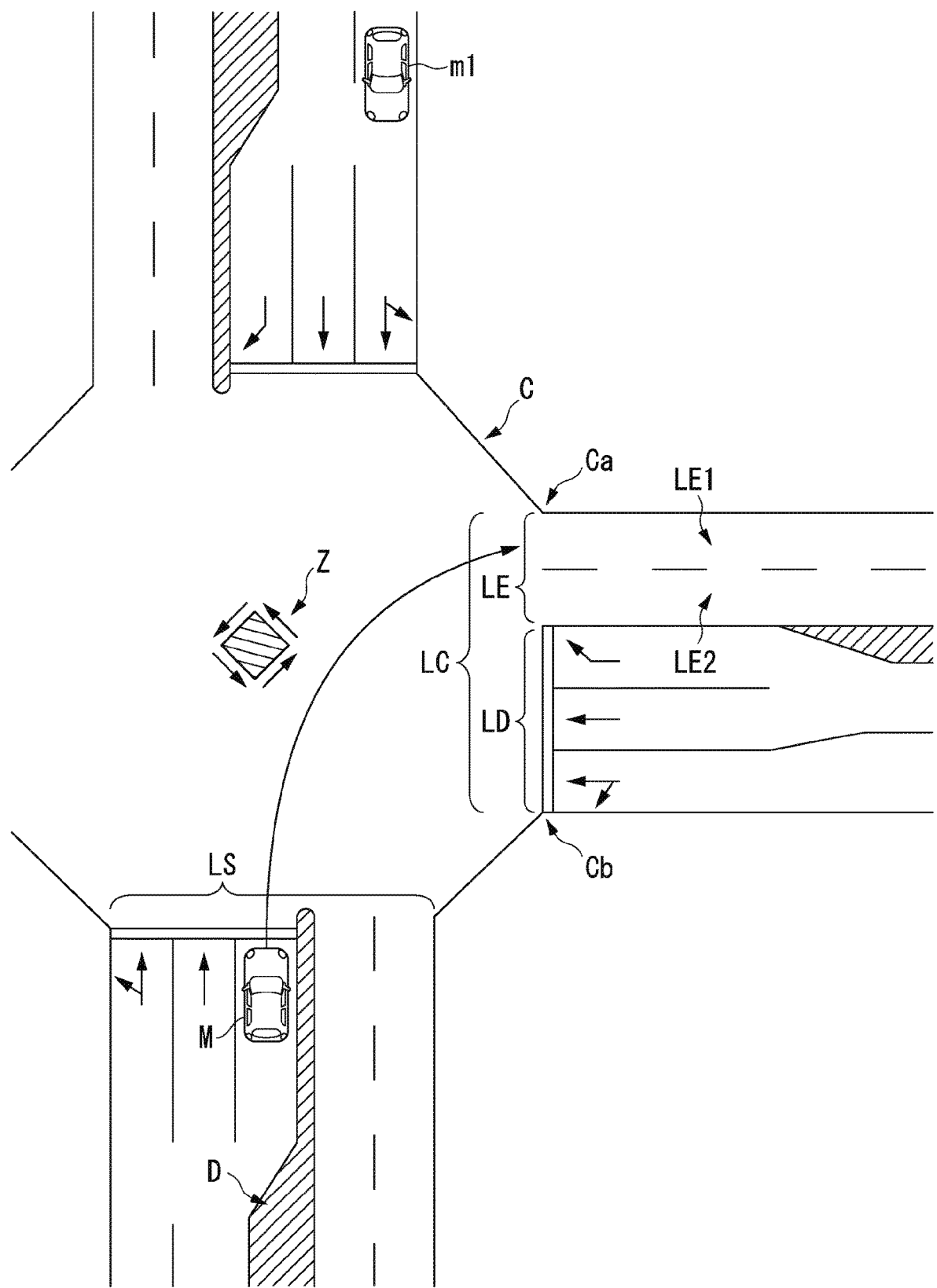
FIG. 7 is a view showing an example of an intersection where there is no median strip D.

FIG. 7 is a view showing an example of an intersection where there is no median strip D. In a case where the median strip D cannot be recognized, the road recognition section 131 may recognize a corner C that is present in the intersection where the vehicle M turns right. For example, in a recognition process of the corner C, the road recognition section 131 recognizes end parts Ca, Cb of the road of the right turn destination. The end parts Ca, Cb are, for example, starting points of the intersecting road LC of the right turn destination. The end parts Ca, Cb may have a width to some extent. In a case where the end parts Ca, Cb are recognized, the road recognition section 131 recognizes a position of a corner C corresponding to the end part Ca on a far side in a view from the vehicle M. The road recognition section 131 recognizes each of the lanes of the road of the right turn destination on the basis of the position of the recognized corner C.

In the example of FIG. 7, for example, with reference to the position of the corner C recognized by the road recognition section 131, the driving control unit 141 allows the vehicle M to enter the most distant lane LE1 in a view from the vehicle M among the plurality of lanes of the road of the right turn destination. In a case where an opposing vehicle m1 is present, the driving control section 141 allows the vehicle M to wait until a timing when the vehicle M can turn right on the basis of a traveling state of the opposing vehicle m1 and then allows the vehicle M to enter the lane LE1.

[Process Flow]

Figure 8:
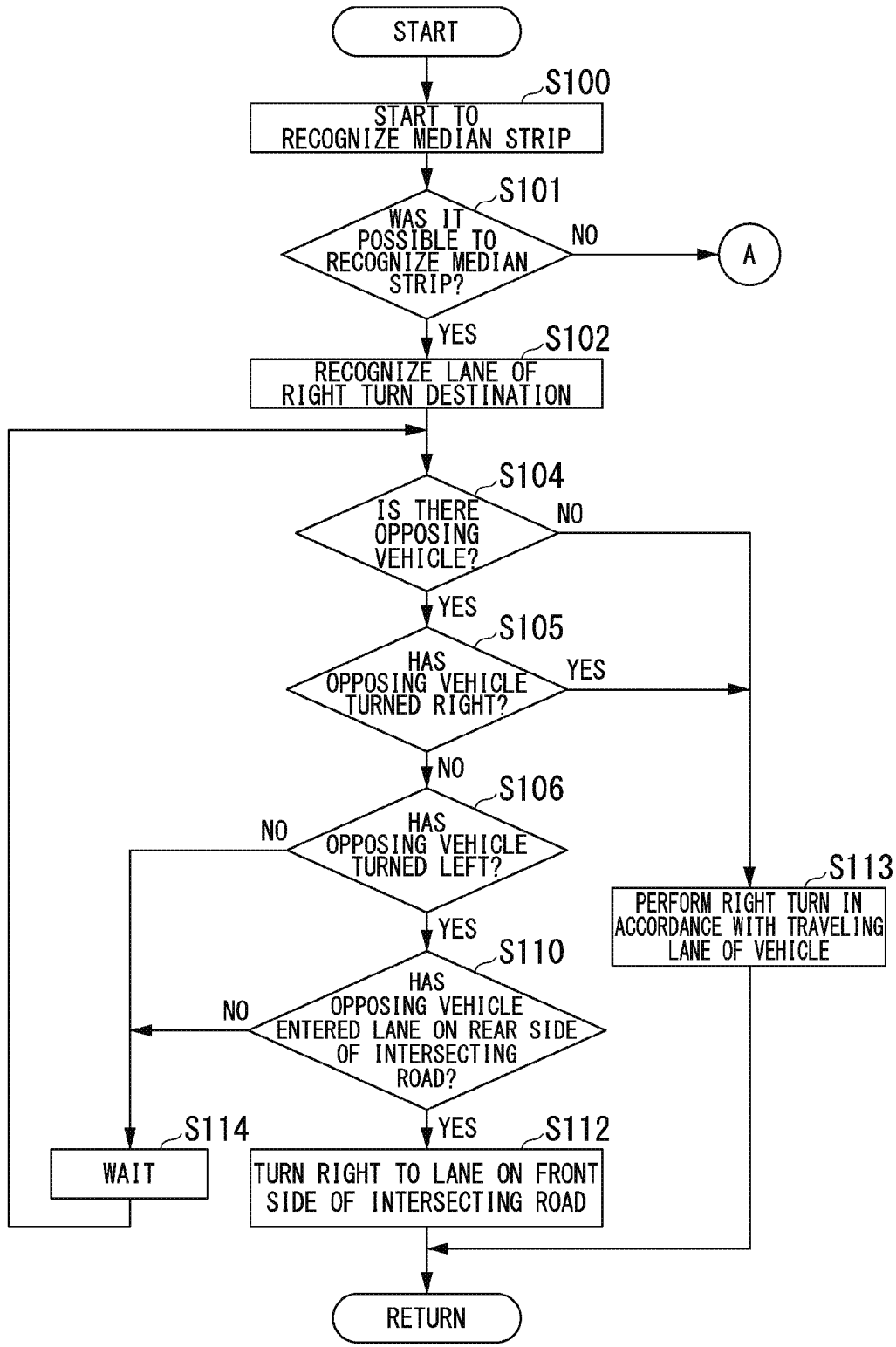
FIG. 8 is a flowchart showing an example of a flow of a process performed in an automated driving control device 100.
Figure 9:
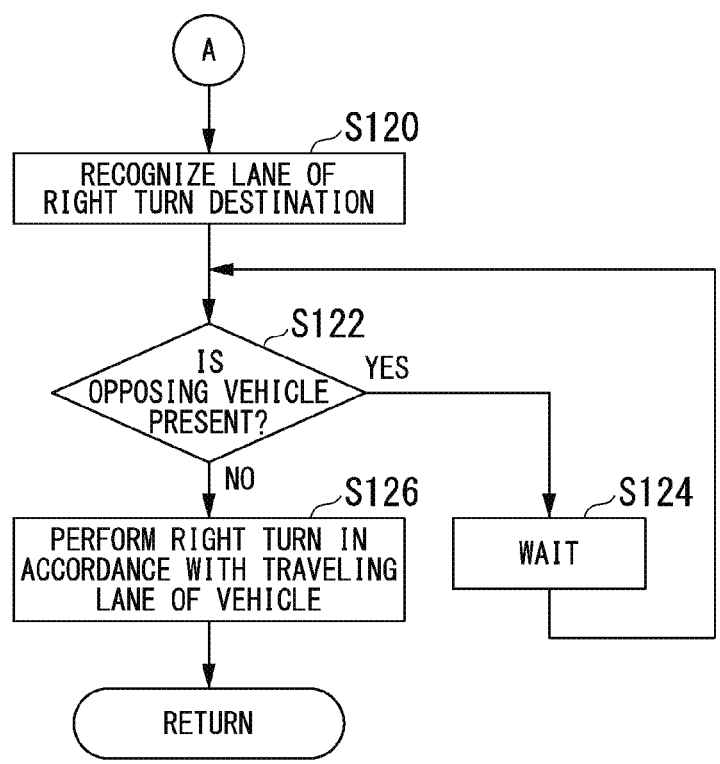
FIG. 9 is a flowchart showing an example of a process when the median strip D is not recognized.

Next, a flow of a process performed in the automated driving control device 100 will be described. Hereinafter, a process at a time of a right turn will be described. FIG. 8 is a flowchart showing an example of a flow of a process performed in the automated driving control device 100.

For example, in a case where the vehicle M arrives at the intersecting road LC that intersects the traveling lane LS on which the vehicle M is traveling, the road recognition section 131 starts to recognize the median strip D of the intersecting road LC that intersects the traveling lane LS on the basis of the recognition result of the object recognition device 16 (Step S100).

It is determined whether or not it was possible to recognize the median strip D in the intersecting road LC that intersects the traveling lane LS on the basis of the recognition result of the object recognition device 16 (Step S101). When a positive determination is obtained in Step S101, the road recognition section 131 estimates the position of the median strip D and recognizes a plurality of lanes of the intersecting road LC of the right turn destination on the basis of the estimated position of the median strip D (Step S102). When a negative determination is obtained in Step S101, the road recognition section 131 proceeds to a process of a flowchart of FIG. 8 described later.

The second-vehicle recognition section 132 determines whether or not there is an opposing vehicle m1 that approaches from a direction opposite to the vehicle M among other vehicles m on the basis of the recognition result of the object recognition device 16 at a time of a right turn (Step S104).

When a negative determination is obtained in Step S104, the driving control unit 141 allows the vehicle M to enter any of the plurality of lanes LE of the intersecting road LC and allows the vehicle M to turn right on the basis of the position in the right turn lane in which the vehicle M travels among the plurality of lanes of the road of the right turn destination (Step S113). The position in the right turn lane refers to a lane number from the left along the proceeding direction in the right turn lane including one or more lanes.

When a positive determination is obtained in Step S104, the second-vehicle recognition section 132 determines whether or not the other vehicle which was the opposing vehicle m1 has turned right (Step S105). When a positive determination is obtained in Step S105, the driving control unit 141 allows the vehicle M to enter any of the plurality of lanes LE of the intersecting road LC on the basis of the position in the right turn lane in which the vehicle M travels among the plurality of lanes of the road of the right turn destination, and allows the vehicle M to turn right (Step S113).

When a negative determination is obtained in Step S105, the second-vehicle recognition section 132 determines whether or not the other vehicle which was the opposing vehicle m1 has turned left (Step S106). When a negative determination is obtained in Step S106, the driving control unit 141 prioritizes traveling of the opposing vehicle m1, the entry control to the road of the right turn destination of the vehicle M is made to be in a standby state (Step S114), and the process returns to Step S104.

When a positive determination is obtained in Step S106, the second-vehicle recognition section 132 determines whether or not the opposing vehicle m1 has entered a lane on the rear side among the plurality of lanes LE of the intersecting road LC by turning left (Step S108). When a negative determination is obtained in Step S108, in order to prevent interference between trajectories of the vehicle M and the other vehicle which was the opposing vehicle m1, the driving control unit 141 prioritizes traveling of the other vehicle which was the opposing vehicle m1, the entry control to the road of the right turn destination of the vehicle M is made to be in a standby state (Step S114), and the process returns to Step S104.

When a positive determination is obtained in Step S108, the driving control unit 141 determines whether or not the vehicle M is able to enter a more front lane in a view from the vehicle M than a lane in which the other vehicle which was the opposing vehicle m1 travels among the plurality of lanes LE of the intersecting road LC on the basis of the position in the right turn lane in which the vehicle M travels (Step S110).

When a negative determination is obtained in Step S110, in order to prevent interference between trajectories of the vehicle M and the other vehicle which was the opposing vehicle m1, the driving control unit 141 prioritizes traveling of the other vehicle which was the opposing vehicle m1, the entry control to the road of the right turn destination of the vehicle M is made to be in a standby state (Step S114), and the process returns to Step S104.

When a positive determination is obtained in Step S110, since the trajectories of the vehicle M and the other vehicle which was the opposing vehicle m1 do not interfere with each other, the driving control unit 141 allows the vehicle M to enter the more front lane in a view from the vehicle M than the lane in which the other vehicle which was the opposing vehicle m1 travels (Step S112).

FIG. 8 is a flowchart showing an example of a process in a case where the median strip D is not recognized. In a case where the median strip D is not recognized in Step S102, and a negative determination is obtained, the road recognition section 131 recognizes the lane of the right turn destination of the intersecting road LC (Step S120). The second-vehicle recognition section 132 determines whether or not an opposing vehicle m1 is present (Step S122).

When a positive determination is obtained in Step S122, in order to prevent interference between trajectories of the vehicle M and the opposing vehicle m1, the driving control unit 141 prioritizes traveling of the opposing vehicle m1, the entry control to the road of the right turn destination of the vehicle M is made to be in a standby state (Step S124), and the process returns to Step S122.

When a negative determination is obtained in Step S122, since the trajectories of the vehicle M and the other vehicle which was the opposing vehicle m1 do not interfere with each other, the driving control unit 141 allows the vehicle M to enter any of the plurality of lanes LE of the intersecting road LC on the basis of the arrangement of the lane in which the vehicle M is positioned among the plurality of lanes of the road of the right turn destination, and allows the vehicle M to turn right (Step S126).

According to the embodiment described above, in a case where there is an opposing vehicle when the vehicle M turns right, the vehicle system 1 can perform a control that allows the vehicle M to proceed to an intersecting road. In particular, in a case where there is an opposing vehicle when the vehicle M turns right, and in a case where the opposing vehicle m1 enters a lane on the rear side among the plurality of lanes LE of intersecting road LC, the vehicle system 1 may allow the vehicle to enter a lane on the front side, and it is possible to prevent the vehicle M from excessively waiting at the time of turning right.

Figure 10:
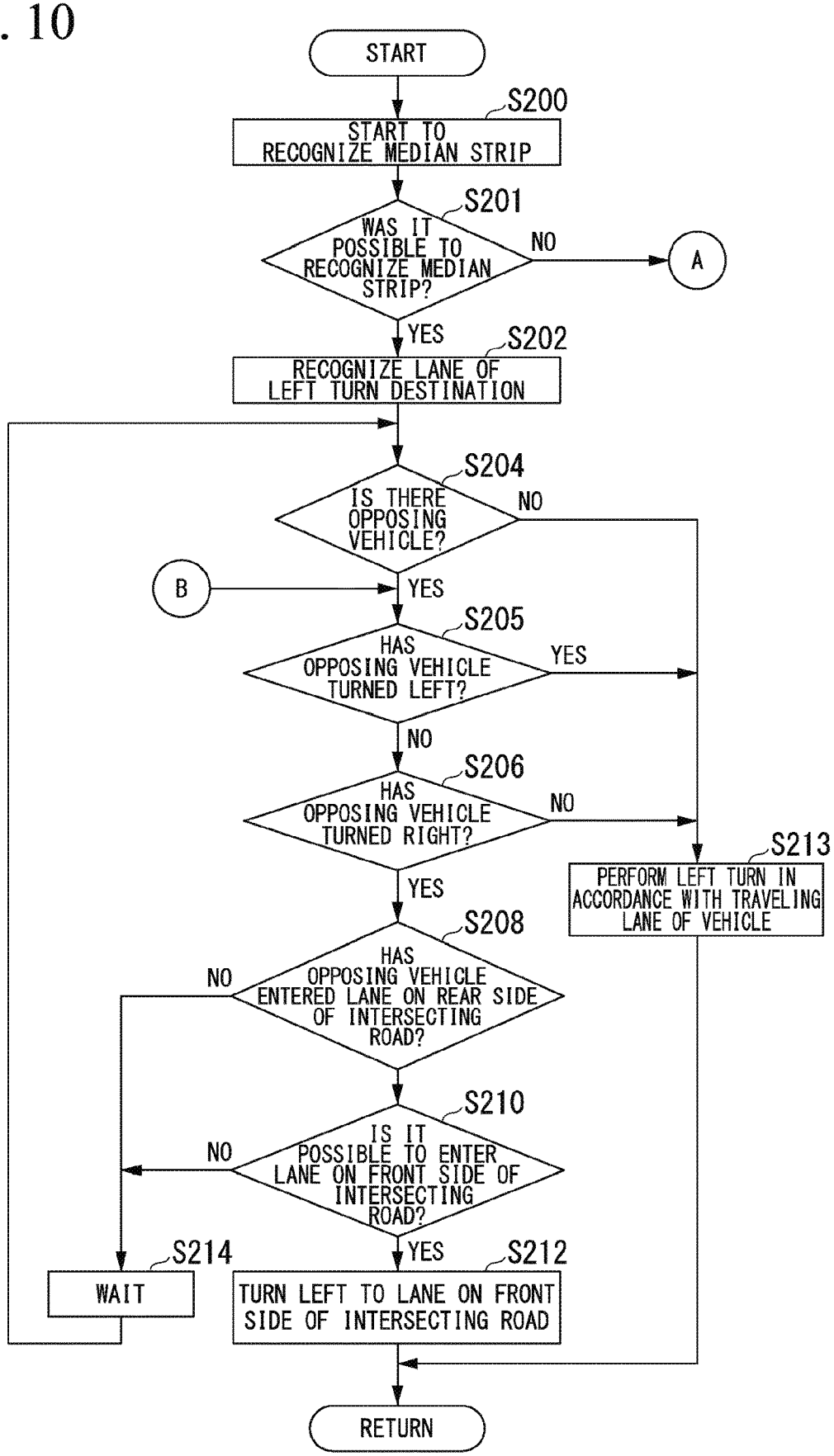
FIG. 10 is a flowchart showing an example of a flow of a process performed in the automated driving control device 100.
Figure 11:
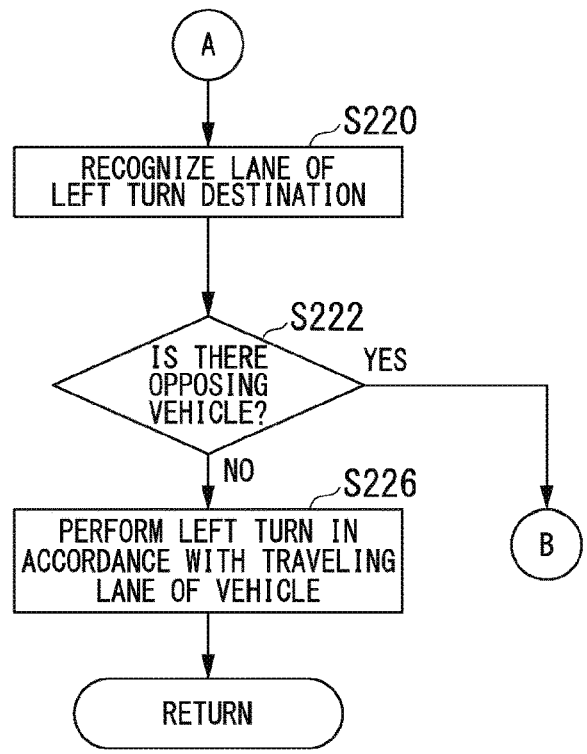
FIG. 11 is a flowchart showing an example of a flow of a process performed in the automated driving control device 100.

Hereinafter, a process at a time of turning left will be described. FIG. 10 and FIG. 11 are flowcharts showing an example of a flow of a process performed in the automated driving control device 100. A basic process is similar to the flow of the process in which the right and left sides are switched at a time of turning right. In the following, a different process from that at the time of turning right is described.

In Step S206, the second-vehicle recognition section 132 determines whether or not the other vehicle which was the opposing vehicle m1 has turned right. When a negative determination is obtained in Step S206, the driving control unit 141 allows the vehicle M to enter any of the plurality of lanes LD of the intersecting road LC on the basis of the position in the left turn lane in which the vehicle M travels among a plurality of lanes of the road of the right turn destination, and allows the vehicle M to turn left (Step S213).

In Step 222, the second-vehicle recognition section 132 determines whether or not there is an opposing vehicle m1. When a positive determination is obtained in Step S222, the second-vehicle recognition section 132 allows the process to return to Step S205.

Figure 12:
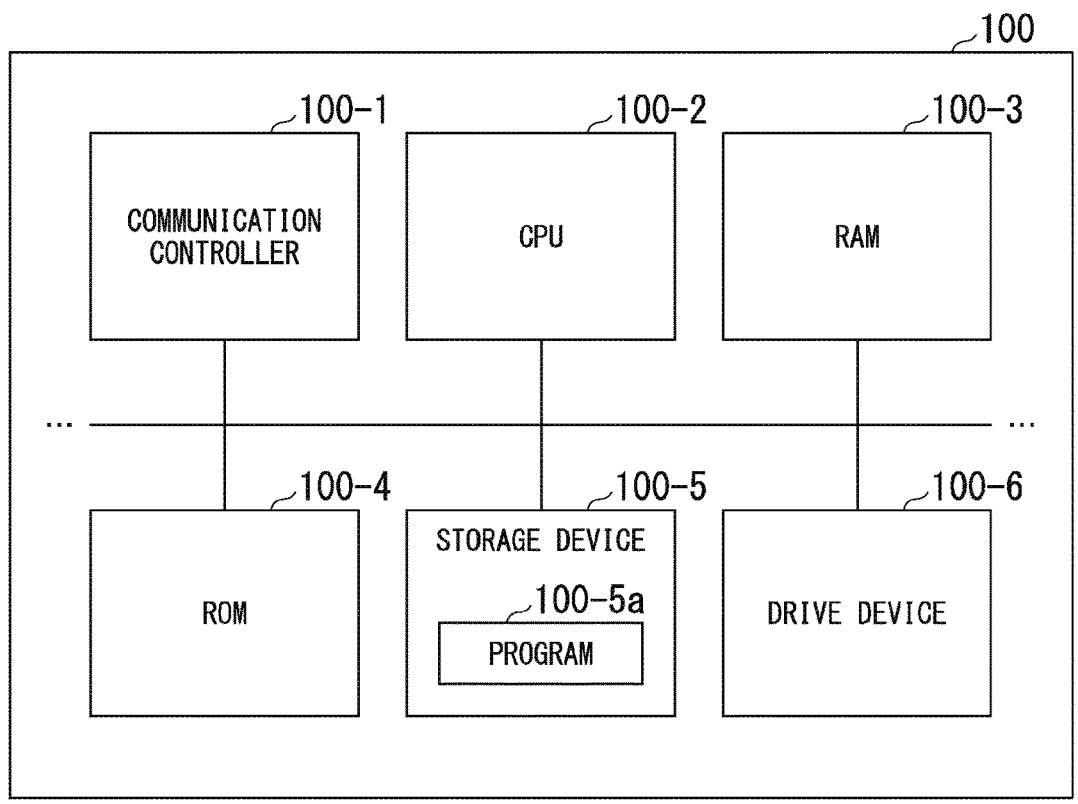
FIG. 12 is a view showing a plurality of configurations that can be used in the automated driving control device 100.

Hereinafter, a hardware aspect of the embodiment will be described. FIG. 12 is a view showing a plurality of configurations that can be used in the automated driving control device 100. The automated driving control device 100 has a configuration in which a communication controller 100-1, a CPU 100-2, a RAM 100-3 used as a working memory, a ROM 100-4 storing a boot program and the like, a storage device 100-5 such as a flash memory or a HDD, a drive device 100-6, and the like are interconnected by an internal bus or a dedicated communication line.

The communication controller 100-1 communicates with a configuration element other than the automated driving control device 100 shown in FIG. 1. The storage device 100-5 stores a program 100-5a executed by the CPU 100-2. This program is expanded to the RAM 100-3 by a DMA (Direct Memory Access) controller (not shown) and the like and is executed by the CPU 100-2. Thereby, some or all of the recognition unit 130, the action plan generation unit 140, the acquisition unit 162, the speed control unit 164, and the steering control unit 166 are implemented.

The embodiment described above can be represented as follows.

The vehicle control apparatus includes a storage device, and a hardware processor that executes a program stored in the storage device, wherein the hardware processor is configured, by executing the program, to: recognize a road form around a vehicle; recognize a state of another vehicle around the vehicle; allow the vehicle to travel by controlling one or both of steering and acceleration/deceleration of the vehicle; prevent, upon passing of the vehicle through an intersection, passing of the vehicle through the intersection based on a presence of the recognized other vehicle; and in a case where it is recognized that a plurality of lanes are present in a road of a right/left turn destination of the vehicle and it is recognized that an opposing vehicle approaching from a direction opposing the vehicle has entered a lane on a rear side in a view from the vehicle among the plurality of lanes in the road of the right/left turn destination, continue an entry control to the road of the right/left turn destination of the vehicle.

Although an embodiment of the present invention has been described, the present invention is not limited to the embodiment, and various modifications and substitutions can be made without departing from the scope of the present invention.

DESCRIPTION OF THE REFERENCE SYMBOLS

1 Vehicle system
10 Camera
12 Radar device
14 Finder
16 Object recognition device
20 Communication device
40 Vehicle sensor
50 Navigation device
51 GNSS receiver
51 Receiver
52 Navigation HMI
53 Route determination part
54 First map information
61 Recommended lane determination part
62 Second map information
80 Driving operation element
100 Automated driving control device
100-1 Communication controller
100-2 CPU
100-3 RAM
100-4 ROM
100-5 Storage device
100-5a Program
100-6 Drive device
120 First control part
130 Recognition unit
131 Road recognition section
132 Second-vehicle recognition section 140 Action plan generation unit
141 Driving control section
160 Second control part
162 Acquisition unit
164 Speed control unit
166 Steering control unit
200 Travel drive force output device
210 Brake device
220 Steering device

What is claim is:

1. A vehicle control apparatus, comprising:
a road recognizer that recognizes a road form around a vehicle;
a second-vehicle recognizer that recognizes a state of another vehicle around the vehicle; and
a driving controller that allows the vehicle to travel by controlling one or both of steering and acceleration/deceleration of the vehicle and that prevents, upon passing of the vehicle through an intersection, passing of the vehicle through the intersection based on a presence of the other vehicle recognized by the second-vehicle recognizer,
wherein in a case where the driving controller recognizes, by the road recognizer, that a plurality of lanes are present in a road of a right/left turn destination of the vehicle, the driving controller continues an entry control to the road of the right/left turn destination of the vehicle and
in a case where the second-vehicle recognizer recognizes that the other vehicle which was the opposing vehicle has entered a lane on a rear side in a view from the vehicle among the plurality of lanes in the road of the right/left turn destination, the driving controller controls the vehicle to enter a lane on a more front side than the lane that the other vehicle which was the opposing vehicle has entered.

2. The vehicle control apparatus according to claim 1, wherein the road recognizer recognizes a median strip on the road and recognizes the lane of the right/left turn destination based on a position of the recognized median strip.

3. The vehicle control apparatus according to claim 1, wherein in a case where it is impossible for the road recognizer to recognize a median strip, the driving controller allows the vehicle to travel, as a target lane of a right/left turn, on a most distant lane in the view from the vehicle among the plurality of lanes of the right/left turn destination across an opposing lane.

4. The vehicle control apparatus according to claim 3, wherein the road recognizer recognizes, among corners that are present at an intersection at which the vehicle turns right or left across the opposing lane, a position of a corner that corresponds to an end part of a road of the right/left turn destination across the opposing lane, the end part being on a far side in the view from the vehicle, and
the driving controller controls the vehicle to enter the most distant lane in the view from the vehicle among the plurality of lanes of the road of the right/left turn destination across the opposing lane using the position of the corner recognized by the road recognizer as a reference.

5. The vehicle control apparatus according to claim 1, wherein the road of the right/left turn destination is a destination of a right/left turn across an opposing lane.

6. The vehicle control apparatus according to claim 1, wherein in a case where the second-vehicle recognizer recognizes that the other vehicle, which was an opposing vehicle approaching from a direction opposing the vehicle, has entered a lane on a rear side in a view from the vehicle among the plurality of lanes in the road of the right/left turn destination, the driving controller continues an entry control to the road of the right/left turn destination of the vehicle.

7. The vehicle control apparatus according to claim 1, wherein in a case where a plurality of lanes of a first road before a right/left turn are present, and a plurality of lanes of a second road of the right/left turn destination are present, the driving controller allows the vehicle to enter, as a target lane of a right/left turn, a lane that corresponds to the vehicle in the first road among the lanes of the second road.

8. The vehicle control apparatus according to claim 7, wherein in a case where a plurality of lanes of a first road before a right/left turn are present, and a plurality of lanes of a second road of the right/left turn destination are present, when the lane in which the vehicle traveled on the first road is an n-th (n is an arbitrary natural number) lane counted from a lane farthest from an opposing lane in a proceeding direction among the lanes of the second road, the driving controller allows the vehicle to enter, as a target lane of a right/left turn, an n-th lane counted from a lane farthest from an opposing lane in a proceeding direction also in a road of a right/left turn destination.

9. A vehicle control method, comprising:
by way of a road recognizer, recognizing a road form around a vehicle;
by way of a second-vehicle recognizer, recognizing a state of another vehicle around the vehicle; and
by way of a driving controller, allowing the vehicle to travel by controlling one or both of steering and acceleration/deceleration of the vehicle, preventing, upon passing of the vehicle through an intersection, passing of the vehicle through the intersection based on a presence of the other vehicle recognized by the second-vehicle recognizer, and in a case where the road recognizer recognizes that a plurality of lanes are present in a road of a right/left turn destination of the vehicle and the second-vehicle recognizer recognizes that the other vehicle, which was an opposing vehicle approaching from a direction opposing the vehicle, has entered a lane on a rear side in a view from the vehicle among the plurality of lanes in the road of the right/left turn destination, continuing an entry control to the road of the right/left turn destination of the vehicle.

10. A computer-readable non-transitory recording medium which comprises a program that causes a computer, comprising a processor, mounted on a vehicle comprising a road recognizer that recognizes a road form around the vehicle to:
recognize a road form around the vehicle;
recognize a state of another vehicle around the vehicle;
allow the vehicle to travel by controlling one or both of steering and acceleration/deceleration of the vehicle;
prevent, upon passing of the vehicle through an intersection, passing of the vehicle through the intersection based on a presence of the recognized other vehicle; and
in a case where it is recognized that a plurality of lanes are present in a road of a right/left turn destination of the vehicle and it is recognized that the other vehicle, which was an opposing vehicle approaching from a direction opposing the vehicle, has entered a lane on a rear side in a view from the vehicle among the plurality of lanes in the road of the right/left turn destination, continue an entry control to the road of the right/left turn destination of the vehicle.

* * * * *